United States Patent
Boyle et al.

(10) Patent No.: US 8,154,812 B1
(45) Date of Patent: Apr. 10, 2012

(54) CONDENSING A DEFECT SCAN LOG FOR A DISK OF A DISK DRIVE

(75) Inventors: William B. Boyle, Lake Forest, CA (US); Srinivas Neppalli, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/253,294

(22) Filed: Oct. 5, 2011

Related U.S. Application Data

(63) Continuation of application No. 12/399,762, filed on Mar. 6, 2009, now Pat. No. 8,040,625.

(51) Int. Cl.
*G11B 27/36* (2006.01)

(52) U.S. Cl. .......................................... 360/31

(58) Field of Classification Search ........................ None
See application file for complete search history.

(56) References Cited

U.S. PATENT DOCUMENTS

| | | | |
|---|---|---|---|
| 5,146,571 A | 9/1992 | Logan | |
| 5,947,232 A | 9/1999 | Traktovenko et al. | |
| 6,034,831 A | 3/2000 | Dobbek et al. | |
| 6,223,303 B1 | 4/2001 | Billings et al. | |
| 6,336,202 B1 | 1/2002 | Tsuchimoto et al. | |
| 6,384,999 B1 | 5/2002 | Schibilla | |
| 6,408,406 B1 | 6/2002 | Parris | |
| 6,606,211 B1 | 8/2003 | Lim et al. | |
| 6,651,192 B1 | 11/2003 | Viglione et al. | |
| 6,691,255 B1 | 2/2004 | Rothberg et al. | |
| 6,704,153 B1 | 3/2004 | Rothberg et al. | |
| 6,710,958 B2 | 3/2004 | Wyatt | |
| 6,862,150 B1 | 3/2005 | Eto | |
| 6,947,232 B2 | 9/2005 | Lim et al. | |
| 6,985,319 B2 | 1/2006 | Yip et al. | |
| 7,072,129 B1 | 7/2006 | Cullen et al. | |
| 7,236,911 B1 | 6/2007 | Gough et al. | |
| 7,269,525 B1 | 9/2007 | Gough et al. | |
| 7,653,847 B1 | 1/2010 | Liikanen et al. | |
| 7,685,360 B1 | 3/2010 | Brunnett et al. | |
| 7,697,388 B2 * | 4/2010 | Chiang et al. | 369/53.17 |
| 8,040,625 B1 | 10/2011 | Boyle et al. | |
| 2001/0055172 A1 | 12/2001 | Yip et al. | |
| 2002/0191319 A1 | 12/2002 | Liew et al. | |
| 2004/0100715 A1 | 5/2004 | Smith et al. | |
| 2006/0056088 A1 | 3/2006 | Kudoh et al. | |
| 2007/0025005 A1 | 2/2007 | Shimizu | |
| 2007/0263313 A1 | 11/2007 | Kitamura et al. | |

OTHER PUBLICATIONS

Office Action dated Dec. 28, 2010 from U.S. Appl. No. 12/399,762, 15 pages.
Final Office Action dated Apr. 5, 2011 from U.S. Appl. No. 12/399,762, 12 pages.
Notice of Allowance dated Jun. 23, 2011 from U.S. Appl. No. 12/399,762, 13 pages.

* cited by examiner

*Primary Examiner* — Daniell L Negron
*Assistant Examiner* — Regina N Holder

(57) ABSTRACT

The embodiments relate to optimizing a defect log of a storage device, such as a disk drive. The defect log may comprise entries for individual locations, such as sectors on a disk, and entries indicating zones. A zone comprises a plurality of locations in the medium of the storage device and may contain adjacent or non-adjacent defects. One or more medium of the storage device may be scanned for defects and locations of these defects are recorded in the defect log. The defect log may then be analyzed to determine if certain number of defects are in proximity to each other, adjacent or non-adjacent, within a zone. If the defects within a zone exceed a threshold, then the defect log may be condensed by coalescing the individual entries of the defects into zone entries. In addition, the defect log may be further condensed by coalescing zone entries of adjacent zones into combined entries.

16 Claims, 6 Drawing Sheets

FIG. 5A

LOG BEFORE COALESCING

| TRACK | TRACK COUNT | WEDGE | WEDGE COUNT |
|---|---|---|---|
| 2805 | 1 | 78 | 1 |
| 2807 | 1 | 68 | 1 |
| 2808 | 1 | 28 | 1 |
| 2808 | 1 | 72 | 1 |
| 2808 | 1 | 128 | 1 |
| 2809 | 1 | 62 | 1 |
| 2812 | 1 | 68 | 1 |
| 2813 | 1 | 72 | 1 |
| 2814 | 1 | 65 | 1 |
| 2818 | 1 | 38 | 1 |
| 2818 | 1 | 138 | 1 |
| 2819 | 1 | 70 | 1 |
| 2824 | 1 | 112 | 1 |
| 2824 | 1 | 122 | 1 |
| 2828 | 1 | 108 | 1 |
| 2828 | 1 | 128 | 1 |
| 2830 | 1 | 37 | 1 |
| 2832 | 1 | 105 | 1 |
| 2832 | 1 | 112 | 1 |
| 2832 | 1 | 125 | 1 |
| 2832 | 1 | 132 | 1 |
| 2833 | 1 | 112 | 1 |
| 2833 | 1 | 132 | 1 |
| 2835 | 1 | 105 | 1 |
| 2835 | 1 | 125 | 1 |

FIG. 5B

LOG AFTER COALESCING

| TRACK START | TRACK COUNT | WEDGE START | WEDGE COUNT | DEFECTS |
|---|---|---|---|---|
| 2800 | 20 | 60 | 20 | 8 |
| 2808 | 1 | 28 | 1 | 1 |
| 2808 | 1 | 128 | 1 | 1 |
| 2818 | 1 | 38 | 1 | 1 |
| 2818 | 1 | 138 | 1 | 1 |
| 2820 | 20 | 100 | 40 | 12 |
| 2830 | 1 | 37 | 1 | 1 |

US 8,154,812 B1

CONDENSING A DEFECT SCAN LOG FOR A DISK OF A DISK DRIVE

REFERENCE TO RELATED APPLICATIONS

This application is a continuation of U.S. application Ser. No. 12/399,762, now U.S. Pat. No. 8,040,625, entitled "CONDENSING A DEFECT SCAN LOG FOR A DISK OF A DISK DRIVE," which was filed on Mar. 6, 2009, and is incorporated by reference in its entirety.

BACKGROUND

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

Typically, a conventional hard disk drive includes one or more disks wherein each disk includes a plurality of concentric tracks. Each surface of each disk conventionally contains a plurality of concentric data tracks angularly divided into a plurality of data sectors. In addition, special servo information may be provided on each disk to determine the position of the moveable transducer head. The moveable transducer head typically includes a writer and a reader.

The most popular form of servo is called "embedded servo" wherein the servo information is written in a plurality of servo wedges that are angularly spaced from one another and are interspersed between and within data sectors around each track of each disk. Each servo wedge typically includes at least a phase locked loop (PLL) field, a servo sync mark (SSM) field, a track identification (TKID) field, a sector ID field having a sector ID number to identify the sector, and a group of servo bursts (e.g. an alternating pattern of magnetic transitions) that the servo control system of the disk drive samples to align the moveable transducer head with or relative to a particular track. Typically, the servo control system moves the transducer head toward a desired track during a "seek" mode using the TKID field as a control input. Once the moveable transducer head is generally over the desired track, the servo control system uses the servo bursts to keep the moveable transducer head over that track in a "track follow" mode.

During disk drive manufacturing, the disk of the disk drive is scanned to detect defects that are present on the disk. A log is generated to indicate the locations of the defects detected on the disk. The log typically has a finite size. If the log becomes full before the entire surface of the disk is scanned, the disk drive fails the manufacturing process.

The presently-utilized disk drive manufacturing process that fails the disk drive when the finite sized log becomes full unfortunately fails disk drives that are actually capable of passing the manufacturing process. This is because, oftentimes, the continued scanning of the remaining surface of the disk may yield fewer defects such that the disk can still be formatted to achieve the targeted storage capacity for the disk of the disk drive.

Therefore, there is a need in the disk drive manufacturing process to enable further scanning of the disk and to not fail a disk drive based solely on an overflowing log.

BRIEF DESCRIPTION OF THE DRAWINGS

FIG. 5A is a table showing a log before coalescing by the disk drive, according to one embodiment of the invention.

FIG. 5B illustrates a table showing the previously-described log of FIG. 5A after coalescing, according to one embodiment of the invention.

DETAILED DESCRIPTION

Figure 1:
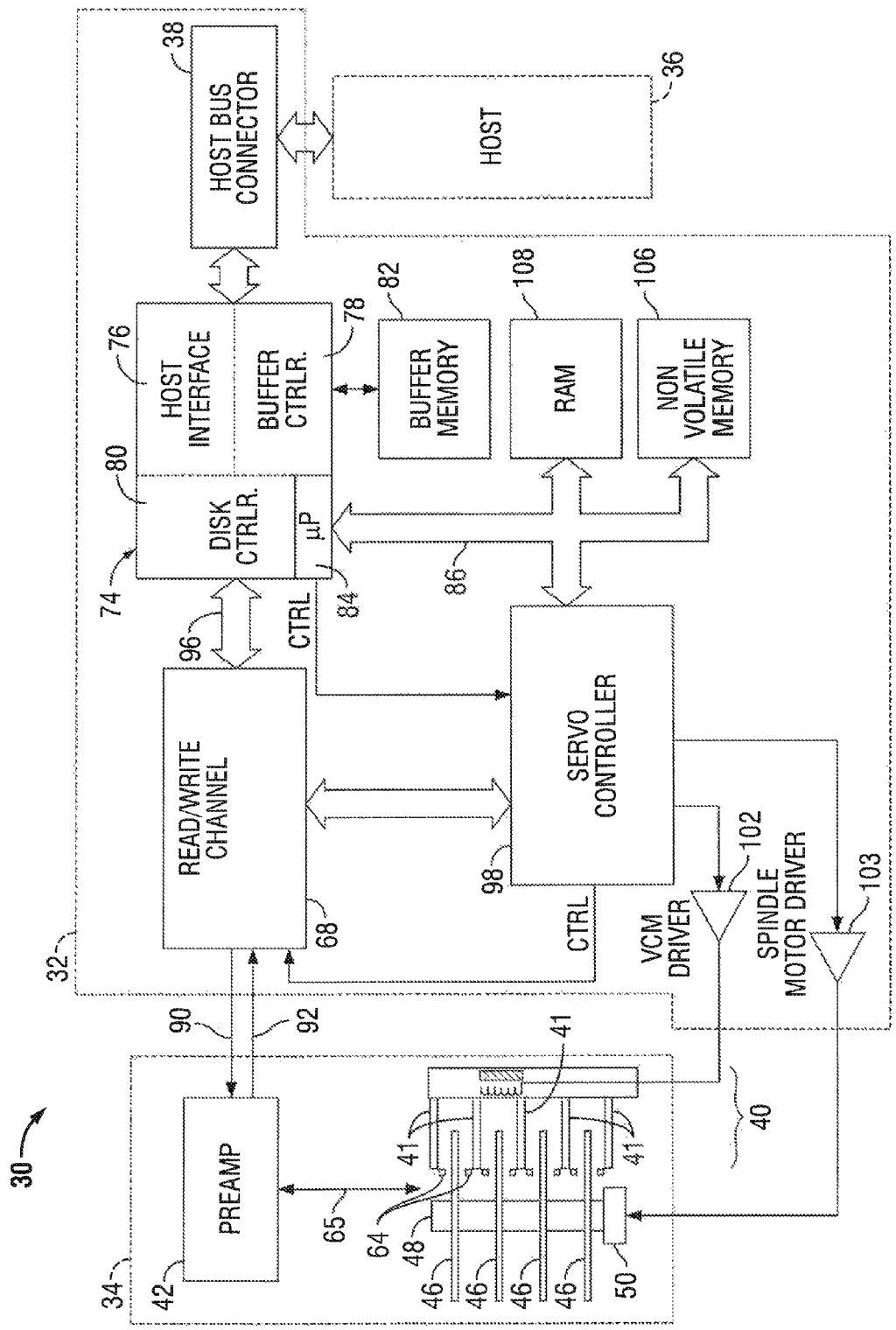
FIG. 1 shows a simplified block diagram of a disk drive, in which embodiments of the invention may be practiced.

FIG. 1 shows a simplified block diagram of a disk drive 30, in which embodiments of the invention may be practiced. Disk drive 30 comprises a Head/Disk Assembly (HDA) 34 and a controller printed circuit board assembly (PCBA) 32. Host 36 may be a computing device such as a desktop computer, a laptop computer, a server computer, a mobile computing device (e.g. PDA, camera, cell-phone, etc.), or any type of computing device. Alternatively, host 36 may be a test computer that performs calibration and testing functions as part of the disk drive manufacturing process. Disk drive 30 may be of a suitable form factor and capacity for computers or for smaller mobile devices (e.g. a small form factor (SFF) disk drive).

HDA 34 comprises: one or more disks 46 for data storage; a spindle motor 50 for rapidly spinning each disk 46 (four shown) on a spindle 48; and an actuator assembly 40 for moving a plurality of heads 64 over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 may include a read/write channel 68, servo controller 98, host interface and disk controller (HIDC) 74, voice coil motor (VCM) driver 102, spindle motor driver (SMD) 103, microprocessor 84, and several memory arrays—buffer or cache memory 82, RAM 108, and non-volatile memory 106.

Host initiated operations for reading and writing data in disk drive 30 may be executed under control of microprocessor 84 connected to the controllers and memory arrays via a bus 86. Program code executed by microprocessor 84 may be stored in non-volatile memory 106 and random access memory RAM 108. Program overlay code stored on reserved tracks of disks 46 may also be loaded into RAM 108 as may be needed for execution.

During disk read and write operations, data transferred by preamplifier 42 may be encoded and decoded by read/write channel 68. During read operations, read/write channel 68 may decode data into digital bits transferred on an NRZ bus 96 to HIDC 74. During write operations, HIDC may provide digital data over the NRZ bus to read/write channel 68 which encodes the data prior to its transmittal to preamplifier 42. As one example, read/write channel 68 may employ PRML (partial response maximum likelihood) coding techniques, although other coding processes may also be utilized.

HIDC 74 may comprise a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

Servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103. For example, disk drive 30 may employ a sampled servo system in which equally spaced servo wedges are recorded on each track of each disk 46. Data sectors are recorded in the intervals between servo wedges on each track. Data sectors may also be split such that a single data sector is recorded on both sides of an intervening servo wedge. Servo wedges are sampled at regular intervals by servo controller 98 to provide servo position information to microprocessor 84. Servo wedges are received by read/write channel 68, and are processed by servo controller 98 to provide position information to microprocessor 84 via bus 86.

Figure 2:
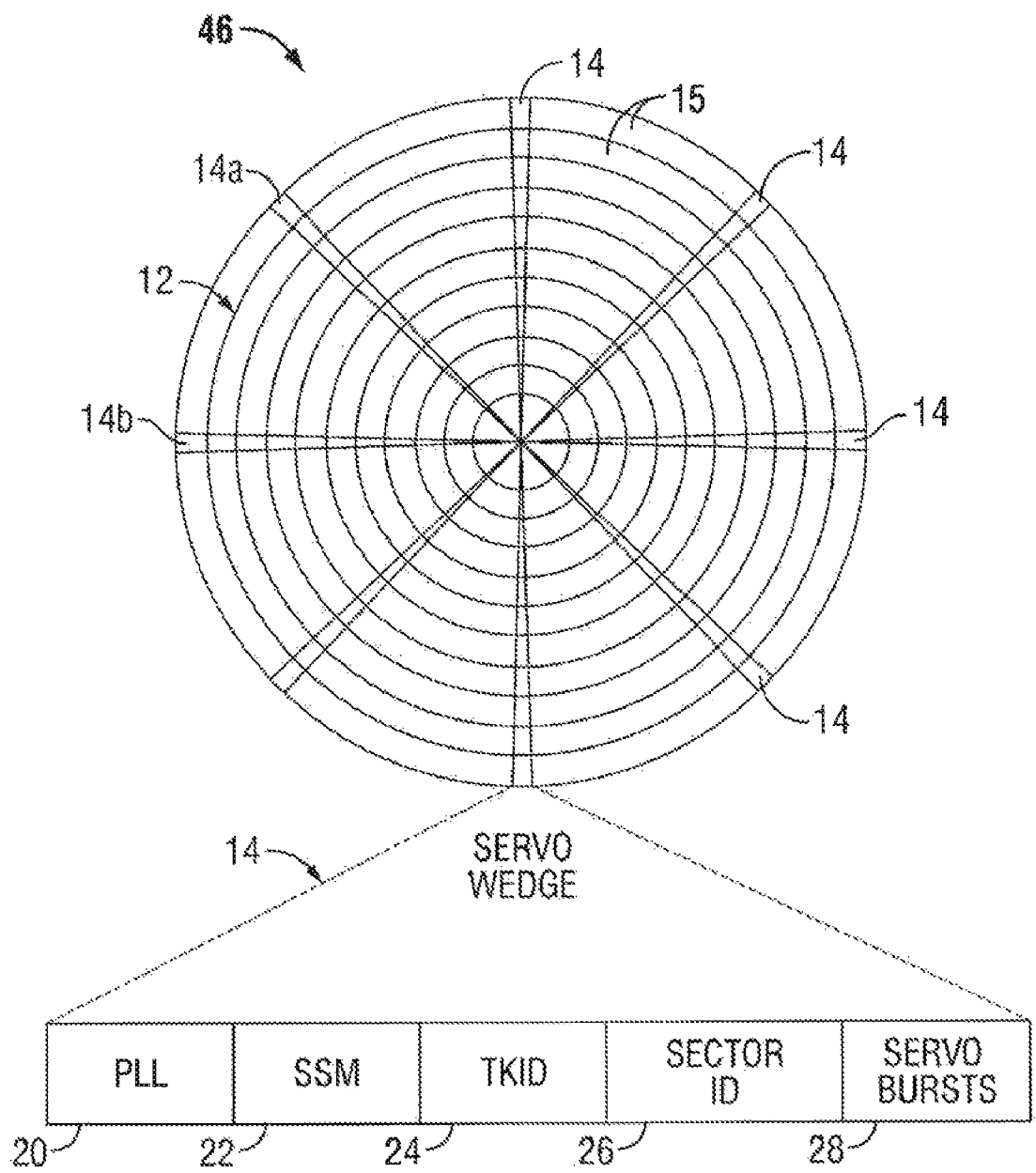
FIG. 2 shows a disk of disk drive having a plurality of concentric tracks, and more particularly, illustrates a disk that includes servo wedges, in accordance with one embodiment of the invention.

FIG. 2 shows a disk 46 of disk drive 30 of FIG. 1 having a plurality of concentric tracks, and more particularly, illustrates a disk 46 that includes servo wedges 14 in accordance with one embodiment of the invention. The plurality of servo wedges 14 are servo-written circumferentially around disk 46 to define circumferential tracks 12 and are utilized in seeking and track following. In particular, embedded servo wedges 14a, 14b, etc., contain servo information utilized in seeking and track following and are interspersed between data regions 15 of the disk 46. Data is conventionally written in the data regions 15 in a plurality of discrete data sectors. Each data region 15 is typically preceded by a servo wedge 14.

Each servo wedge 14 may include: a phase lock loop (PLL) field 20, a servo sync mark (SSM) field 22, a track identification (TKID) field 24, a sector identifier (ID) field 26, and a group of servo bursts (e.g. ABCD) 28 (e.g. an alternating pattern of magnetic transitions) that the servo control system samples to align the moveable transducer head with, and relative to, a particular track. Typically, servo controller 98 moves head 64 toward a desired track during a "seek" mode using the TKID field 24 as a control input. In order to perform seeking and track following operations by servo controller 98, a servo field sync-up operation is performed to detect a servo wedge 14. A preamble—such as the phase lock loop (PLL) field 20—is generally read first by the read/write channel 68 as part of a servo field sync-up operation to recover the timing and gain of the written servo wedge 14. For example, the PLL field may be written with a 2T pattern, as is well known in the art. Next, the servo sync mark (SSM) 22 is read to facilitate block synchronization. The SSM 22 facilitates block synchronization by acting as a special marker that is detected to "frame" data, i.e., to identify a boundary of a block. Servo field sync-up operations to detect a servo preamble, such as PLL 20, to recover the timing and gain of a written servo sector and to detect the servo sector for servo control operations are well known in the art.

Once head 64 is generally over a desired track 12, servo controller 98 uses the servo bursts (e.g. ABCD) 28 to keep head 64 over the track in a "track follow" mode. During track following mode, head 64 repeatedly reads the sector ID 26 of each successive servo wedge to obtain the binary encoded sector ID number that identifies each wedge of the track. Based on the TKID and sector ID, servo controller 98 continuously knows where head 64 is relative to disk 46 and communicates this to microprocessor 84. In this way, the microprocessor 84 continuously knows where the head 64 is relative to the disk and can command the movement of the head 64, via the servo control system, to implement disk drive operations, suck as seeking, tracking, read/write operations, etc.

In one embodiment, microprocessor 84 may operate under the control of a program or routine to execute methods or processes in accordance with embodiments of the invention related to condensing a defect scan log for a disk 46. Microprocessor 84 may perform operations comprising: determining a plurality of defect zones on disk 46 in which each defect zone includes a plurality of physical locations on disk 46, detecting defects on disk 46, and recording those defects into a defect scan log as log entries wherein the log entries comprise a location parameter related to the defect location on disk 46. Further, microprocessor 84 may execute operations comprising determining that the number of defects detected in a first defect zone exceed a first threshold, and, if so, combining the log entries of the first defect zone into a coalesced log entry. For example, such a program may be implemented in software or firmware (e.g., stored in non-volatile memory 106 or other locations) and may be implemented by microprocessor 84. Also, although this process is described with reference to one disk 46, it may often be performed on multiple disks 46.

For the purposes of the present specification, it should be appreciated that the terms "processor", "microprocessor", and "controller", etc., refer to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, etc. Further, it should be appreciated that the term processor, microprocessor, circuitry, controller, etc., refer to any type of logic or circuitry capable of executing logic, commands, instructions, software, firmware, functionality, etc.

Thus, processor 84 controls operations in disk drive 30 to condense a defect scan log for a disk 46. In particular, processor 84 controls a process for condensing the defect scan log for the surface of disk 46 during the manufacturing process to allow for the further scanning of the disk surface to potentially make the surface of the disk usable to meet the targeted storage capacity for the disk drive 30.

Figure 3:
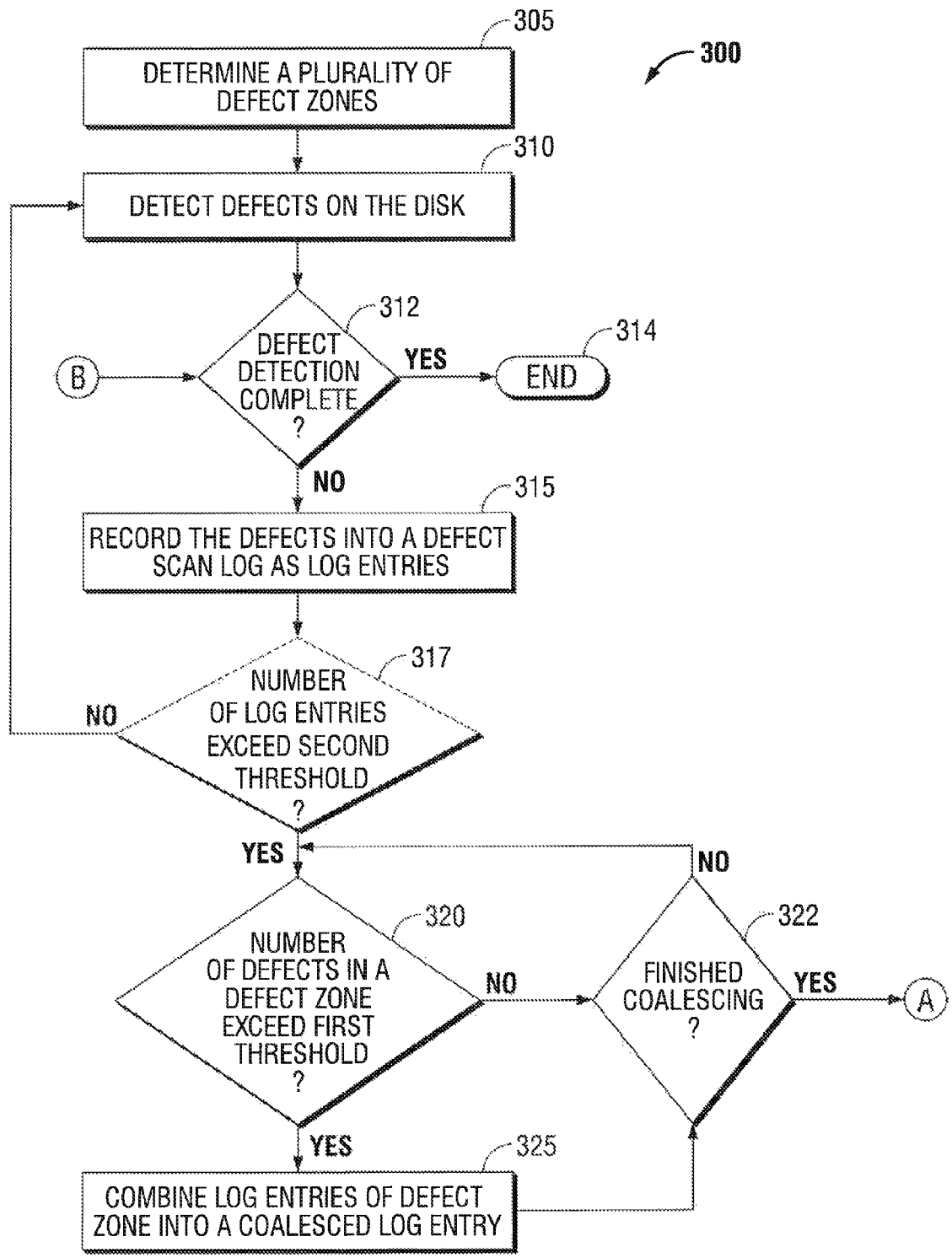
FIG. 3 is a flow diagram of a process to condense a defect scan log for a disk during disk drive manufacturing, according to one embodiment of the invention.

FIG. 3 is a flow diagram of a process 300 to condense a defect scan log for a disk during disk drive manufacturing, according to one embodiment of the invention. In one embodiment, process 300 may be implemented by processor 84 under the control of a program.

In process 300, a plurality of defect zones are determined (block 305). Each defect zone includes a plurality of physical locations on the disk. Next, defects on the disk are detected (block 310). At decision block 312, process 300 determines if the defect detection process is complete, and if so, process 300 ends (block 314), and if not, process 300 records defects into a defect scan log as log entries (block 315). In one embodiment, each log entry may comprise a location parameter related to the defect location on the disk, as will be described in more detail.

In one optional embodiment, process 300 determines whether the number of log entries exceed a second threshold (decision block 317). If the log entries do exceed this second threshold, then process 300 moves on to decision block 320. If not, then process 300 returns to block 310 to detect defects on the disk. This second threshold may be utilized to determine if the number of log entries at least meet a pre-determined threshold of detected defects before moving on with process 300 in which coalescing may occur.

At decision block 320, process 300 determines whether the number of defects in a defect zone exceed a first threshold. If the number of defects in the defect zone exceed a first threshold, then the log entries of the defect zone are combined into a coalesced log entry (block 325).

If the number of defects in a defect zone do not exceed a first threshold or if they have been combined into a coalesced log entry, then process 300 moves on to decision block 322 where it is determined whether coalescing is finished such as when all of the defect zones have been processed. If coalescing is finished, process 300 moves on to circle A, as will be described. If not, process 300 moves back to decision block 320.

Figure 4:
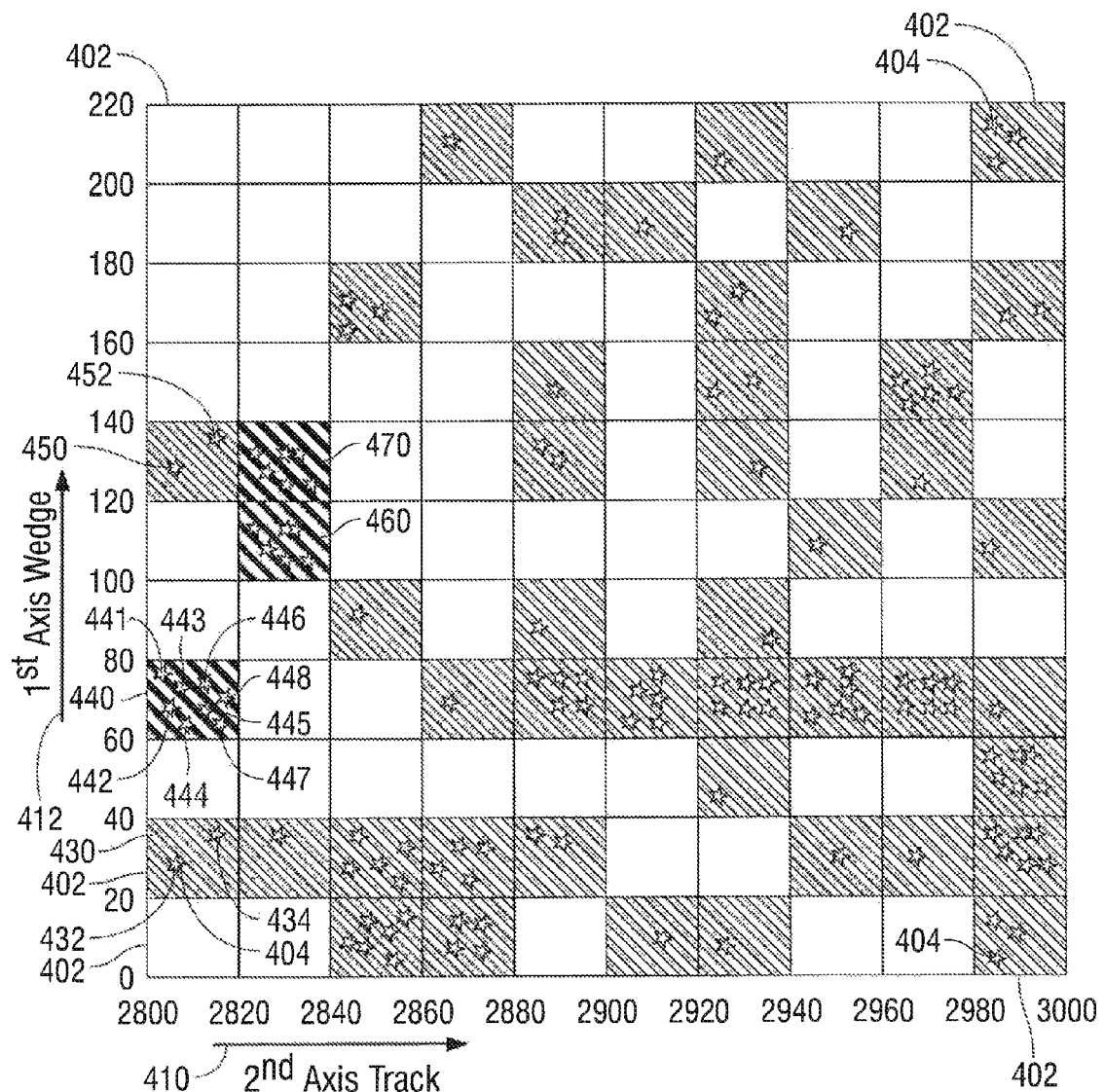
FIG. 4 is a diagram showing an example of a plurality of defect zones divided across physical locations of the disk and, particularly illustrates, defects located within defect zones, according to one embodiment of the invention.

FIG. 4 is a diagram showing an example of a plurality of defect zones 402 divided across physical locations of the disk and, particularly illustrates, defects located within the defect zones, according to one embodiment of the invention. As shown in FIG. 4, a plurality of equally-spaced defect zones 402 across a portion of the disk have been determined and illustrate defects 404 that are located within each of the defect zones. Although, equally-spaced defect zones are described, it should be appreciated that differently-sized defect zones may also be utilized.

In one embodiment, the defect zones may be equally-spaced and divided across a disk space, as shown in FIG. 4, along an x-axis denoting track location 410 and a y-axis 412 denoting wedge locations. Thus, in this example, along the x-axis, tracks of the disk between 2800-3000 are shown and each defect zone 402 includes a range of 20 tracks. Whereas along the y-axis wedges 0-220 are shown wherein each defect zone 402 is divided into 20 wedges. Accordingly, for each equally-sized defect zone, each defect zone 402 is divided into a length of 20 tracks and 20 wedges. It should be appreciated that this is just one example of how defect zones may be sub-divided on a disk to illustrate physical locations on the disk and a wide variety of differing sizes, lengths, etc., may be utilized.

As an example, a defect zone 430 is shown between tracks 2800-2820 and wedges 20-40. In this defect zone, there are two defects 432 and 434 that have been detected. Similarly, another defect zone 440 has been determined between tracks 2800-2820 and wedges 60-80 that includes eight detected defects (441, 442, 443, 444, 445, 446, 447, and 448).

Each of these defects that have been detected are recorded into a defect scan log as a log entry wherein each log entry includes a location parameter related to the defect location on the disk.

FIG. 5A is a table showing a log before coalescing 500 by the disk drive, according to one embodiment of the invention. Log 500 includes a track measurement 502 and a wedge measurement 504 for each defect that has been detected. There is also a track count column 503 and a wedge count column 507 that indicate that each defect has a denoted track count and wedge count of 1.

As an example, with reference also to FIG. 4, defect 441 is identified at line 510. Defect 442 is identified at log line 512. Defect 432 is identified at log line 514. Defect 443 is identified at log line 516. Defect 450 is identified at log line 518. Defect 444 is identified at log line 520. Defect 445 is identified at log line 522. Defect 446 is identified at log line 524. Defect 447 is identified at log line 526. Defect 434 is identified at log line 528. Defect 452 is identified at log line 530. Lastly, defect 448 is identified at log line 532.

Thus, the log before coalescing 500 identifies each detected defect in terms of track location and wedge location. Further, as can be seen by log 500, examples of defect locations for detected defects for defect zones between 2820-2840 and wedges 0-220 are also listed. It should be appreciated that the log before coalescing 500 can be used to cover all of the identified defects as shown in the example of FIG. 4 covering tracks 2800-3000 and wedges 0-220. The log before coalescing size can be pre-determined based upon testing criteria for the disk.

FIG. 5B is a table showing the previously-described log from FIG. 5A after coalescing 520, according to one embodiment of the invention. To illustrate the results of coalescing, with reference also to defect zone 440 of FIG. 4, all of the defects 441, 442, 443, 444, 445, 446, 447, and 448 have been detected and those defects have been recorded into the defect scan log 500 before coalescing, as previously described. After determining that the number of defects detected in defect zone 440 exceeded a first threshold (e.g. greater than two defects) the log entries 510, 512, 516, 520, 522, 524, 526, and 532 are coalesced into line 550 of the log after coalescing 520.

The log after coalescing table 520 includes a track start column, a track count column, a wedge start column, a wedge count column, and optionally a number of defects column. Thus, coalesced log entry line 550 shows a track start of 2800, a track count of 20, a wedge start of 60, a wedge count of 20, and 8 defects thereby illustrating a condensed log entry with 8 defects. This corresponds to defect zone 440 of FIG. 4. Thus, the coalesced log entry includes defects detected on the disk that are in proximity to one another along a first axis 412 corresponding to a circumferential direction for the plurality of wedges and a second axis 410 corresponding to a radial direction for the plurality of tracks.

It should be appreciated that different thresholds for the amount of defects required to be detected may be chosen based upon testing considerations (greater than two being only one example). If the threshold is not met the log entry remains in the log after coalescing, such as shown by lines 552 and 554.

Thus, the processor of the disk drive controls operations in the disk drive to condense a defect scan log for a scanned disk. In particular, the processor provides a process for condensing a defect scan log for a surface of a disk during the manufacturing process to allow for the further scanning of the disk such that the disk drive is not failed due to an overflowing log. In particular, this process by utilizing a coalescing algorithm combines log entries that are in close proximity into a single entry to free up log space for further entries. This process may occur multiple times in the defect scanning process. Accordingly, embodiments of the invention relate to a method of coalescing a defect scan log generated in a disk drive manufacturing process to enable further scanning and to avoid failing a disk drive due to an overflowing log.

Further, two or more defect zones that are adjacent to one another may also be combined to further reduce the size of the defect scan log.

Figure 6:
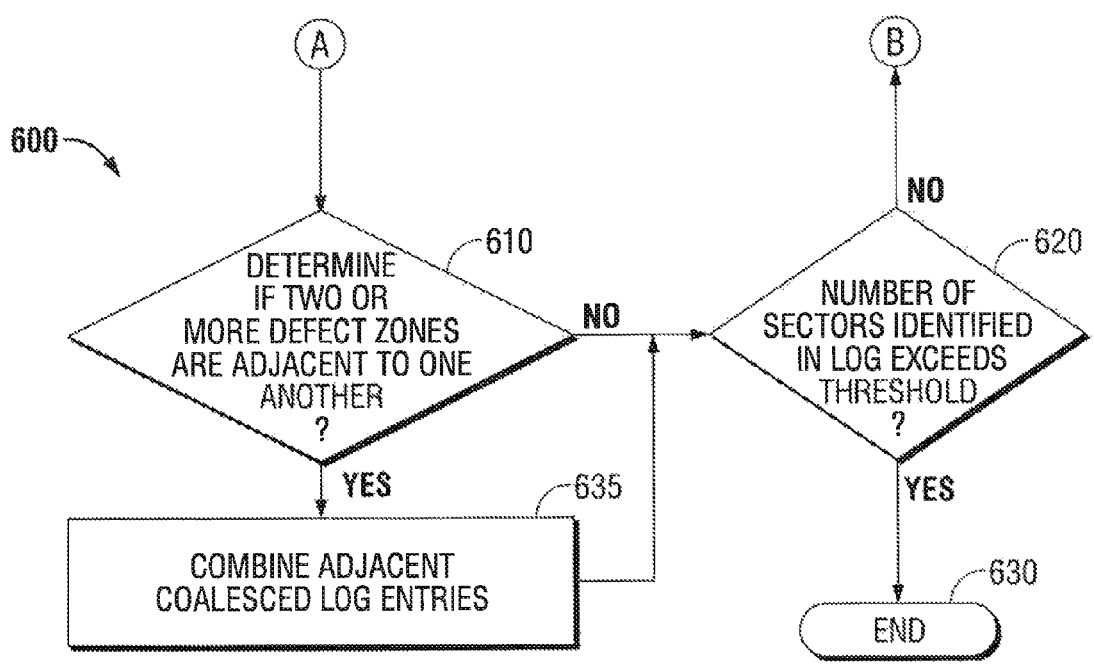
FIG. 6 is a flow diagram of a process to determine if two or more defect zones are adjacent to one another, according to one embodiment of the invention.

FIG. 6 is a flow diagram of a process 600 to determine if two or more defect zones are adjacent to one another and, if so, to combine the adjacent coalesced log entries, according to one embodiment of the invention. In particular, continuing from circle A from FIG. 3, after the number of defects detected in a second defect zone are determined to exceed the first pre-determined threshold and the log entries of the second defect zone are combined into a second coalesced log entry, at decision block 610, process 600 then determines whether the first and second defect zones are adjacent to one another. If so, at block 635, the first and second coalesced log entries are combined into a third coalesced log entry.

Next, at block 620, whether or not adjacent defect zones are present, process 600 determines whether the number of sectors identified in the log after coalescing exceeds a threshold value (decision block 620). If so, then the disk has too many defects such that it is unusable and the disk drive has failed the manufacturing process and the process ends (block 630). However, if the threshold value is not exceeded, then the process to detect defects on the disk continues at circle B (see FIG. 3). The threshold value may be fixed or may change in some embodiments. For example, in embodiments with multiple disk surfaces, the threshold value may be relaxed for one disk surface if one or more other disk surfaces had few defects, which resulted in higher available capacity from the other disk surfaces to meet a targeted capacity point for the disk drive.

In one optional embodiment, process 600 may further determine whether the number of log entries exceed a second threshold prior to determining that number of defects detected in the first and second defect zones exceed the first pre-determined threshold. If so, process 600 continues to decision block 610. If not, process 600 continues to decision block 620. This second threshold may be utilized to determine if the number of log entries at least meet a pre-determined threshold of detected defects before moving on with process 600 in which coalescing may occur.

To illustrate an example of the combining of adjacent defect zones, as shown in FIG. 4, a first defect zone 460 between tracks 2820-2840 and wedges 100-120 is detected and the individual defects are written into the log before coalescing 500. A second defect zone 470 between tracks 2820-2840 and wedges 120-140 is also detected and the individual defects are written into the log before coalescing 500. Further, a first coalesced log entry is written in the log after coalescing 520 for the first defect zone and a second coalesced log entry is written in the log after coalescing 520 for the second defect zone.

Next, after the first and second defect zones 460 and 470 are determined to be adjacent to one another, the first and second coalesced log entries for these first and second defect zones are combined into a third coalesced log entry.

For example, at line 570 of the table for the log after coalescing 520, it can be seen that both the log entries for the adjacent defect zones 460 and 470 have been coalesced into line 570 having a track start at 2820 with a track count of 20, a wedge start at 100 with a wedge count of 40, and having a total number of 12 defects.

Embodiments of the invention provide a process and method for coalescing a defect scan log generated by a disk drive during the manufacturing process such that a disk drive is not improperly failed due to an overflowing of the log. In particular, a process is provided for condensing a defect scan log for a scanned disk during the manufacturing process to allow further scanning of the disk surface and potentially making the surface of the disk usable to meet the targeted storage capacity for the disk drive. In this way, the disk drive manufacturing process is improved.

While embodiments of the invention and its various functional components have been described in particular embodiments, it should be appreciated that the embodiments can be implemented in hardware, software, firmware, or combinations thereof.

The methods and processes previously described can be employed for disk drives with embedded servo systems. However, numerous alternatives for disk drives or other types of storage devices with similar or other media format characteristics can be employed by those skilled in the art to use the invention with equal advantage to implement these techniques. Further, although embodiments have been described in the context of a disk drive with embedded servo wedges, the invention can be employed in many different types of disk drives or other storage devices having a head that scans the media.

What is claimed is:

1. A method for optimizing a defect log for a medium of a storage device, wherein the defect log comprises entries indicating individual locations in the medium of the storage and zone entries indicating zones comprising a plurality of locations in the medium of the storage device, the method comprising:
   detecting defects in locations in the medium of the storage device;
   recording the locations of the defects into respective entries for individual locations in the defect log;
   determining a quantity of defects that are adjacent or non-adjacent within a first zone of locations based on the entries of detected defects;
   recording a zone entry in the defect log for the first zone of locations when the quantity of defects within the first zone exceed a threshold; and
   removing the respective entries of the defects from the defect log that are within the zone entry for the first zone.

2. The method of claim 1, wherein the zone entries indicating a zone comprise a first parameter indicating a plurality of wedges and a second parameter indicating a plurality of tracks.

3. The method of claim 1, wherein recording the zone entry for the first zone of locations when the quantity of defects within the first zone exceed a threshold comprises recording the zone entry for the first zone of locations when the quantity of defects within the first zone exceed a threshold when the size of the defect log exceeds a threshold size.

4. The method of claim 1, further comprising:
   determining when zones recorded in the defect log are adjacent to one another based on their respective zone entries; and
   combining the zone entries of adjacent zones into a single zone entry encompassing the adjacent zones.

5. The method of claim 4, further comprising determining that the size of the defect log exceed a second threshold size prior to determining that the number of defects detected in adjacent zones and combining the zone entries of the adjacent zones.

6. The method of claim 4, wherein the sizes of the adjacent zones are approximately equal.

7. The method of claim 1, wherein the defect log is condensed prior to use of the storage device with a host device.

8. The method of claim 7, further comprising determining if a number of sectors identified in the defect log exceeds a threshold value.

9. A disk drive comprising:
   a disk including a plurality of tracks of sectors having a plurality of wedges;
   a head to perform read operations from the disk including reading defects on the disk; and
   a processor for controlling operations in the disk drive to condense a defect log for the disk, wherein the defect log comprises entries indicating defects located in individual sectors in the disk and zone entries indicating zones comprising at least a plurality of tracks and wedges, the operations comprising:
   detecting defects in sectors in the disk of the disk drive,
   recording the locations of the defects into respective entries for individual sectors in the defect log,
   determining a quantity of defects that are adjacent or non-adjacent within a first zone based on the entries of detected defects,
   recording a zone entry in the defect log for the first zone when the quantity of defects within the first zone exceed a threshold, and
   removing the respective entries of the defects from the defect log that are within the zone entry for the first zone.

10. The disk drive of claim 9, wherein the zone entry comprises adjacent and non-adjacent defects detected on the disk that are in proximity to one another along a first axis corresponding to a circumferential direction for the plurality of wedges and a second axis corresponding to a radial direction for the plurality of tracks.

11. The disk drive of claim 9, wherein the processor performs operations further comprising determining that the number of log entries exceed a second threshold prior to recording a zone entry in the defect log for the first zone when the quantity of defects within the first zone exceed a threshold, and removing the respective entries of the defects from the defect log that are within the zone entry for the first zone.

12. The disk drive of claim 9, wherein the processor performs operations further comprising:
   determining that the number of defects detected in a second zone exceed the first threshold;
   recording a second zone entry for the second zone;
   determining that the first and second zones are adjacent to one another based on the zone entry and second zone entry; and
   combining the zone entry and second zone entry into a single zone entry that encompasses at least the first and second zones.

13. The disk drive of claim 12, wherein the processor performs operations further comprising determining that the number of log entries exceed a second threshold prior to determining that the first and second zones are adjacent to one another based on the zone entry and second zone entry and combining the zone entry and second zone entry into a single zone entry that encompasses at least the first and second zones.

14. The disk drive of claim 12, wherein the sizes of the first and second zones are approximately equal size.

15. The disk drive of claim 9, wherein the defect log is condensed prior to use of the disk drive with a host device.

16. The disk drive of claim 15, wherein the processor performs operations further comprising determining if a number of sectors identified in the defect log exceed a threshold value.

* * * * *